United States Patent
Huang et al.

(10) Patent No.: US 11,208,959 B2
(45) Date of Patent: Dec. 28, 2021

(54) SYSTEM AND METHOD FOR FLEXIBLE FUEL USAGE FOR GAS TURBINES

(71) Applicant: General Electric Company, Schenectady, NY (US)

(72) Inventors: Yimin Huang, Simpsonville, SC (US); Manuel Cardenas, Simpsonville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/346,973

(22) Filed: Nov. 9, 2016

(65) Prior Publication Data
US 2018/0128175 A1 May 10, 2018

(51) Int. Cl.
*F02C 9/28* (2006.01)
*F02C 3/30* (2006.01)
*F02C 9/40* (2006.01)

(52) U.S. Cl.
CPC .......... *F02C 9/28* (2013.01); *F02C 3/30* (2013.01); *F02C 9/40* (2013.01); *F05D 2270/083* (2013.01)

(58) Field of Classification Search
None
See application file for complete search history.

(56) References Cited

U.S. PATENT DOCUMENTS

| | | | |
|---|---|---|---|
| 4,012,904 A * | 3/1977 | Nogle | F23R 3/34 60/39.511 |
| 5,185,997 A * | 2/1993 | Nishijima | F02C 7/185 60/740 |
| 6,405,521 B1 * | 6/2002 | Ranasinghe | F01K 21/047 60/39.182 |
| 8,145,403 B2 | 3/2012 | Fuller et al. | |
| 8,484,981 B2 | 7/2013 | Nag | |
| 2004/0134194 A1 * | 7/2004 | Roby | F02C 3/24 60/750 |
| 2009/0071118 A1 * | 3/2009 | Ma | F23L 7/005 60/39.26 |
| 2009/0223201 A1 * | 9/2009 | Anand | F01K 23/068 60/39.461 |
| 2009/0260368 A1 * | 10/2009 | Benz | C10J 3/00 60/780 |
| 2010/0162678 A1 * | 7/2010 | Annigeri | F02C 3/22 60/39.281 |
| 2010/0275609 A1 * | 11/2010 | Snider | F02C 7/224 60/773 |

(Continued)

OTHER PUBLICATIONS

Technical Report AFAPL-TR-75-70, Joseph M. Kuchta, Summary of Ignition Properties of Jet Fuels and Other Aircraft Combustible Fluids, Air Force Aero Propulsion Laboratory, Mar. 3, 1976.*

*Primary Examiner* — Todd E Manahan
*Assistant Examiner* — Rodolphe Andre Chabreyrie
(74) *Attorney, Agent, or Firm* — Fletcher Yoder, P.C.

(57) ABSTRACT

A system includes a gas turbine system having a first compressor, a combustor, and a turbine, where the first compressor provides a first portion of a discharge air directly to the combustor. The system includes a fluid circuit which receives a fluid comprising a second portion of the discharge air from the first compressor or a combustible fluid and provides the second portion of the discharge air to fuel at a location upstream of the combustor to alter a chemical and physical characteristic of the fuel in an air-fuel mixture that is provided to the combustor.

18 Claims, 4 Drawing Sheets

(56) References Cited

U.S. PATENT DOCUMENTS

| | | | |
|---|---|---|---|
| 2011/0016866 A1* | 1/2011 | Boardman | F23R 3/36 |
| | | | 60/730 |
| 2012/0036863 A1* | 2/2012 | Kirzhner | F02C 7/22 |
| | | | 60/776 |
| 2013/0008172 A1 | 1/2013 | Erickson et al. | |
| 2013/0305735 A1* | 11/2013 | Ahn | F02C 9/26 |
| | | | 60/776 |
| 2014/0083078 A1* | 3/2014 | Dinu | F02C 3/22 |
| | | | 60/39.463 |
| 2014/0260314 A1* | 9/2014 | Koganezawa | F02C 9/40 |
| | | | 60/787 |
| 2015/0184594 A1* | 7/2015 | Stammen | F02C 9/46 |
| | | | 60/776 |
| 2017/0152797 A1* | 6/2017 | Pyrhonen | F02D 35/02 |

\* cited by examiner

SYSTEM AND METHOD FOR FLEXIBLE FUEL USAGE FOR GAS TURBINES

BACKGROUND

The subject matter disclosed herein relates to gas turbine engines and more particularly relate to systems and methods for enabling gas turbine engines use different fuel types while reducing the types of hardware (e.g., fuel nozzles) to burn the different fuel types.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a gas turbine system having a first compressor, a combustor, and a turbine, where the first compressor provides a first portion of a discharge air directly to the combustor. The system includes a fluid circuit which receives a fluid comprising a second portion of the discharge air from the first compressor or a combustible fluid and provides the second portion of the discharge air or the combustible fluid to a fuel supply at a location upstream of the combustor to alter a chemical and physical characteristic of the fuel in an air-fuel mixture that is provided to the combustor.

In a second embodiment, a system includes a gas turbine system having a first compressor, a combustor, and a turbine, where the first compressor provides a first portion of a discharge air directly to the combustor. The system includes a dilution air circuit which receives a second portion of the discharge air from the first compressor and to provide the second portion of the discharge air to fuel at a location upstream of the combustor to alter a chemical and physical characteristic of the fuel in an air-fuel mixture that is provided to the combustor. The system includes a second compressor disposed along the dilution air circuit, where the second compressor increases a pressure of the second portion of the discharge air prior to the location. The system includes a heat exchanger disposed along the dilution air circuit, where the heat exchanger cools the second portion of the discharge air prior to the location. The system includes one or more sensors configured to measure one or more operating conditions of the gas turbine system. The system includes a closed-loop controller communicatively coupled to the one or more sensors, where the controller is programmed to receive one or more signals representative of the one or more operating conditions from the one or more sensors, calculate a Wobbe index value for the fuel based on the one or more signals, determine if the Wobbe index value of the fuel is within a desired range, and adjust a flow rate of the second portion of the discharge air provided to the fuel if the Wobbe index value is outside the desired range.

In a third embodiment, a method includes receiving, via at a controller, one or more signals representative of one or more operating conditions of a gas turbine system from one or more sensors. The method includes calculating, via the controller, a Wobbe index value for a fuel provided to the gas turbine system. The method includes determining if the Wobbe index value is of the fuel is within a desired range based on the one or more signals. The method includes adjusting a flow rate of a portion of discharge air provided to the fuel if the Wobbe index value is outside the desired range, wherein the portion of the discharge air is diverted from a compressor of the gas turbine system to a location upstream of a combustor of the gas turbine system along a dilution air circuit, and the air is cooled along the dilution air circuit prior to the location.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward providing systems and methods for controlling the chemical and physical characteristics (e.g., Wobbe index or heating value) of the fuel to enable the same combustion hardware (e.g., nozzles) to be used for various fuel supplies. The fuel supplies may include propane, natural gas, syngas, etc. The systems and methods disclosed relate to a fluid circuit (e.g., a dilution air circuit) that enables a diluent (e.g., compressor discharge air) or a combustible fuel to be introduced to a fuel supply to adjust the chemical and physical characteristics of the fuel. As described in detail below, the chemical and physical characteristics of the fuel that may be adjusted include the heating value or Wobbe index of the fuel.

When the fluid circuit utilizes a dilution air circuit, the fluid circuit may include a secondary compressor, one or more heat exchangers, a fuel supply conduit to receive a cooled diluent from the heat exchanger, one or more control valves to control the flow of the fuel to the fuel nozzle, and a control system. Alternatively, the fluid circuit may utilize another diluents source and/or a combustible fuel source without using the heat exchangers and/or the secondary compressor. By controlling the amount of purge air, other diluent source, and/or the combustible fuel added to the fuel supply (e.g., adjusting the fuel composition), the same combustion hardware, including the fuel nozzle, may be used to reduce the types of hardware used in the flexible fuel system. Adjusting the chemical and physical characteristics (e.g., Wobbe index or heating value) of the fuel includes altering a chemical and physical characteristic of the fuel, such as by cooling a portion of the compressor purge air to a temperature less than an auto-ignition temperature of the fuel. By adjusting the chemical and physical characteristics (e.g., Wobbe index or heating value) of the fuel, many fuel types may be used with the same combustion hardware (e.g., nozzles, covers).

Figure 1:
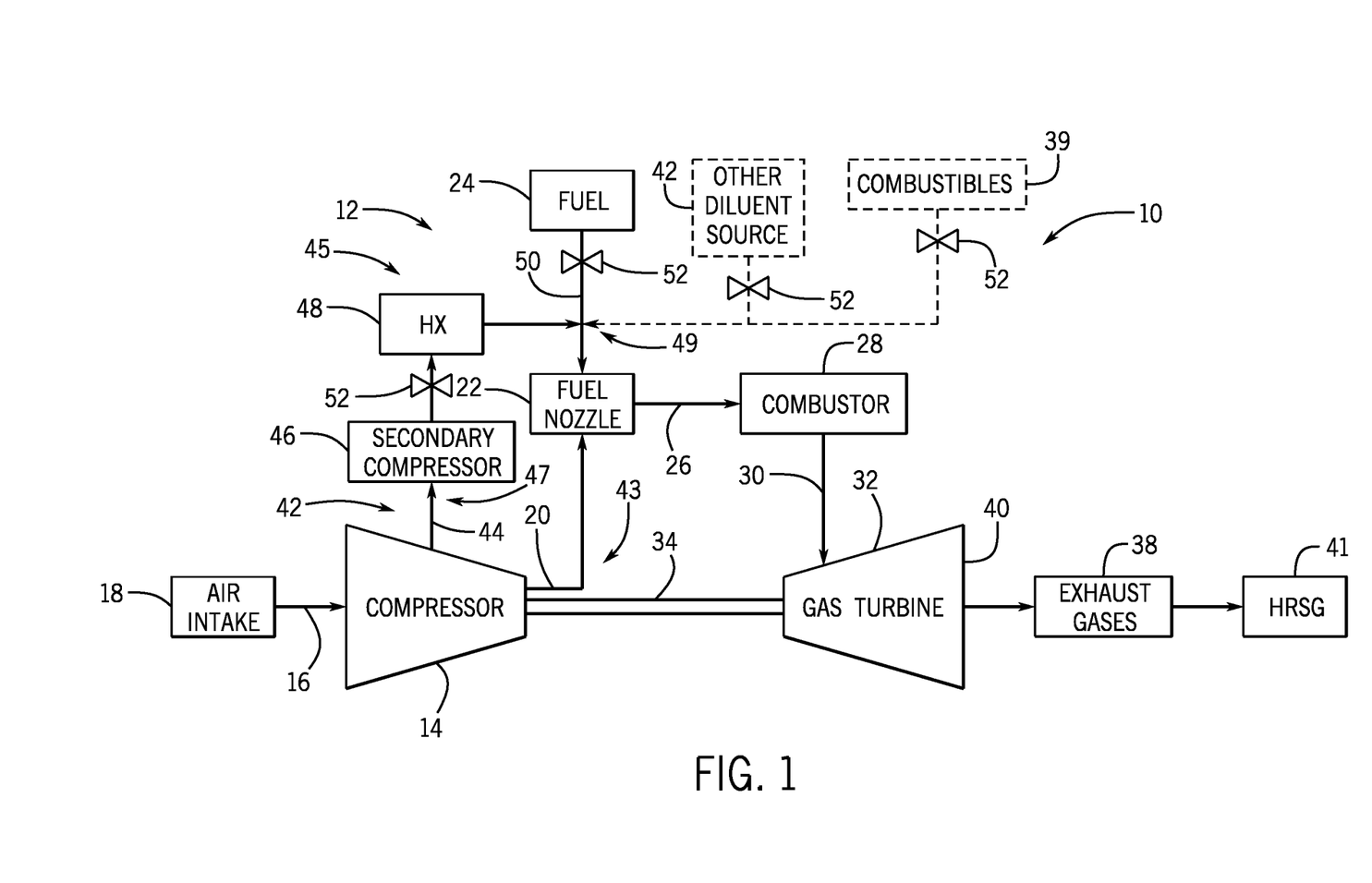
FIG. 1 is a block diagram of an embodiment of a gas turbine system using a flexible fuel system.
Figure 2:
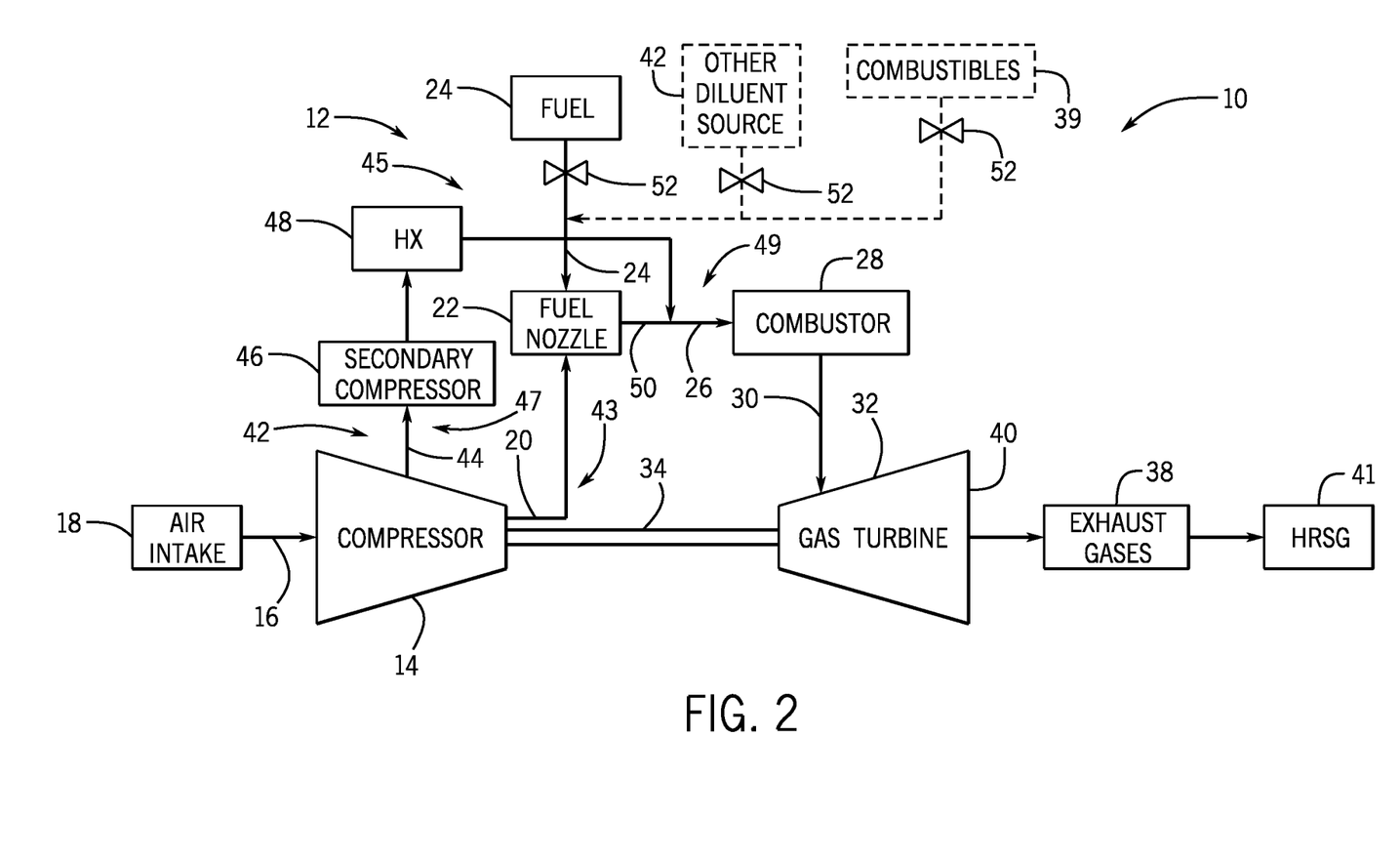
FIG. 2 is a block diagram of a second embodiment of the gas turbine system using a flexible fuel system.

Turning now to the drawings, FIGS. 1 and 2 illustrate block diagrams of embodiments of the gas turbine system 10 using a flexible fuel system 12. A compressor 14 intakes ambient air 16 to the gas turbine system 10 via an air intake 18. The ambient air 16 is taken in by the air intake 18 into the gas turbine system 10 via a suitable mechanism, such as a cold air intake, for subsequent entry of an inlet air 16 into the compressor 14. The compressor 14 compresses inlet air 16, forming pressurized air 20 by rotating blades within the compressor 14. When the compressor 14 compresses the inlet air 16, the compressor 14 adds energy to the inlet air 16 thereby increasing the pressure and the temperature such that the pressurized air 20 is warmer and at a higher pressure than the ambient air 16. The pressurized air 20 may be discharged into one or more fuel nozzles 22, which mix the pressurized air 20 and a fuel 24 (e.g., a liquid fuel and/or gas fuel, such as natural gas) to produce an air-fuel mixture 26 suitable for combustion.

As depicted, a first portion 43 of air from the compressor 14 (e.g., the pressurized air 20) enters the one or more fuel nozzles 22 and mixes with fuel 24. The fuel nozzle 22 directs the air-fuel mixture 26 into a combustor 28. The combustor 28 ignites and combusts the air-fuel mixture 26, to form combustion products 30. The combustion products 30 are directed to a gas turbine 32, where the combustion products 30 expand and drive blades of the gas turbine 32 about a shaft 34.

The gas turbine 32 is connected to the compressor 14 by the common shaft 34. Compressor vanes or blades are included as components of a compressor 14. Blades within the compressor 14 are coupled to a shaft 34, which is driven by the gas turbine 32. The shaft 34 is coupled to several components (e.g., compressor 14, gas turbine 32 throughout the gas turbine system 10. Eventually, the combustion products 30 exit the gas turbine 32 as exhaust gases 38, which then exit the gas turbine system 10 via an exhaust outlet 40. As will be appreciated, the exhaust gases 38 may be utilized to drive a load (e.g., an electrical generator, a pump, other shaft driven equipment) or directed to a heat recovery steam generator (HRSG) 41.

As discussed herein, the flexible fuel system 12 uses a fluid circuit 45 to enable the gas turbine 32 to use different types of fuel sources (e.g., propane, natural gas, syngas, etc.) with an existing combustion nozzle 22 as the temperature and composition of the fuel supply 24 changes. The fluid circuit 45 enables the chemical and physical characteristics (e.g., Wobbe index or heating value) of the fuel supply 24 to be adjusted to a suitable level for use with the existing combustion nozzle 22 by mixing the fuel supply 24 with a diluent 42 (e.g., an air source). In the illustrated embodiments, the diluent 42 includes purge air 44 that is extracted from the compressor 14. The fluid circuit 45 may include one or more secondary compressors 46, one or more heat exchangers 48, a fuel supply conduit 50 to receive a cooled diluent 42 from the heat exchanger 48, one or more control valves 52 (e.g., to control the flow of the fuel 24 to the fuel nozzle 22, or to control the compressor discharge air to the heat exchanger 45) and a control system (see FIG. 3). Though the diluent described herein describes the purge air 44 as the source of the diluent 42, it may be appreciated that other suitable diluents or fluids may be used to adjust the chemical and physical characteristics of the fuel supply 24. For example, steam, inert gases (e.g., argon), or combustible fluids 39 may be used to adjust the chemical and physical characteristics (e.g., Wobbe index or heating value) of the fuel supply 24. When the source of diluent 42 is steam, an inert gas, or combustible fluids 39, the fluid circuit 45 may operate without the heat exchanger 48 and/or the secondary compressor 46.

A second portion 47 of discharged air (e.g., the purge air 44) may be extracted from the compressor 14 and may enter the secondary compressor 46 upstream of the gas turbine 32. The secondary compressor 46 may adjust the pressure of the purge air 44. For example, the secondary compressor 46 may increase the pressure of the second portion 47 of the discharge air 44. The purge air 44 is then cooled in the heat exchanger 48. Cooling the purge air 44 reduces the temperature of the purge air 44 to a suitable temperature to improve operation of the gas turbine 32 (e.g., to a temperature less than an auto-ignition temperature of the fuel). Adjusting the chemical and physical characteristics may include adjusting the Wobbe index or heating value of the fuel. The purge air 44 may be introduced to the fuel supply conduit 50 in a location 49 upstream from the fuel nozzle 22 and the combustor 28. In other embodiments, the purge air 44 may be introduced to the fuel supply conduit 50 where the location 49 is between the fuel nozzle 22 and the combustor 28, as illustrated in FIG. 2.

Figure 3:
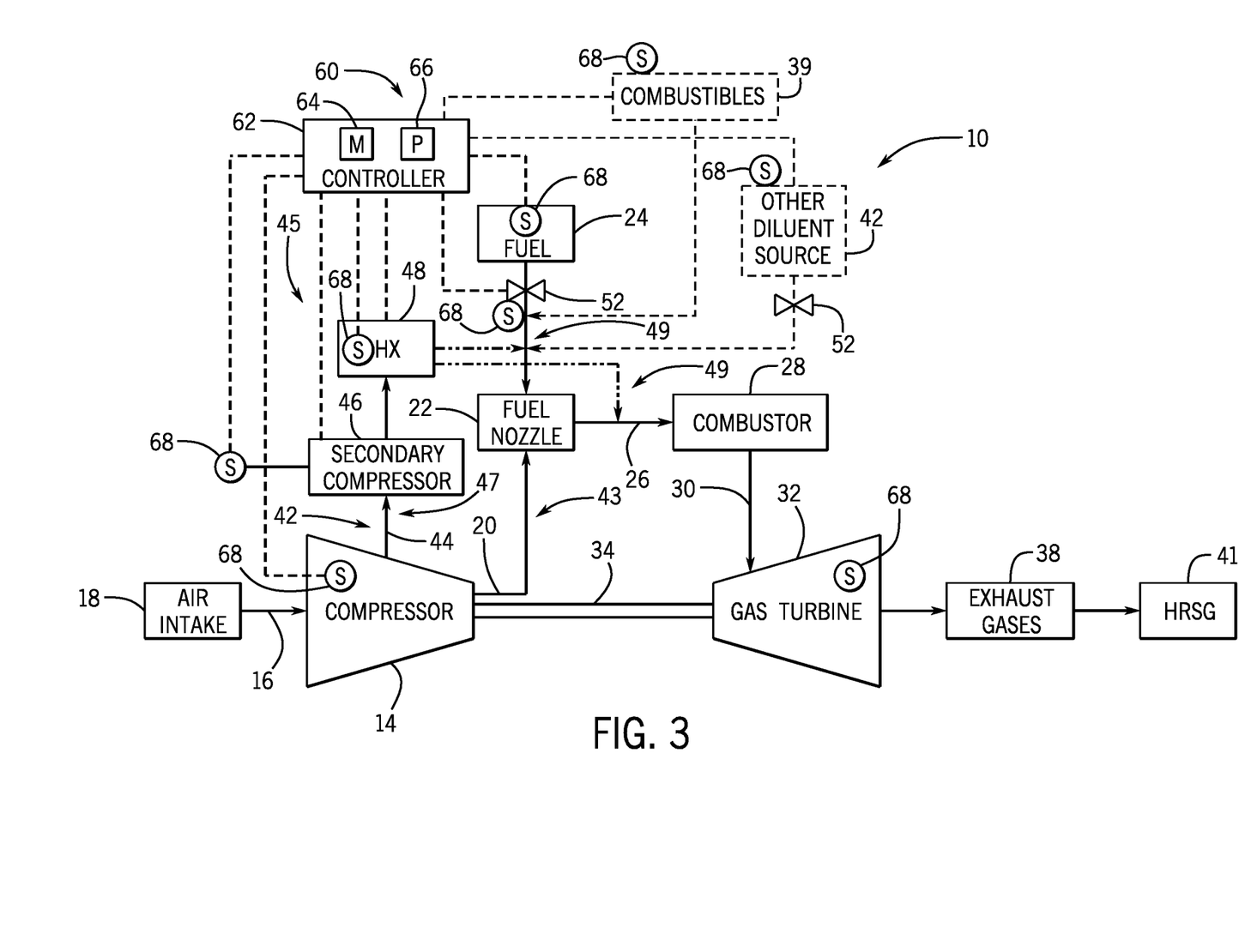
FIG. 3 is a block diagram of the gas turbine system of FIGS. 1 and 2 illustrating a control system to control a flow rate of a fuel supply and/or a flow rate of a diluent added to a fuel supply conduit.

The control system is used to adjust the flow rate of the purge air 44 based in part on feedback received from one or more sensors, as illustrated in FIG. 3. FIG. 3 is a block diagram of the gas turbine system of FIGS. 1 and 2 illustrating a control system 60 to control a flow rate of the fuel supply 24 and/or the flow rate of the diluent 42 added to the fuel supply conduit 50. In the illustrated embodiment, the controller 62 is programmed to regulate an amount (e.g., a flow rate) of the second portion 47 of the discharge air 44 provided by the fluid circuit 45 (e.g., a dilution air circuit) to the fuel 24 to alter the chemical and physical characteristics (e.g., Wobbe index or heating value) of the fuel 24. It may be appreciated that the controller 62 may regulate a composition and/or an amount of an alternative diluent source 42 (e.g., steam, inert gases) and/or composition and/or the amount of the combustible fluid 39 (e.g., hydrocarbons, hydrogen gas, etc.) to alter the chemical and physical characteristics (e.g., Wobbe index or heating value) of the fuel supply 24. The control system 60 includes a controller 62 having a memory 64 and a processor 66.

The memory 64 stores program instructions that are loadable and executable on the processor(s) 66, as well as data generated during the execution of these programs. Depending on the configuration and type of the controller 62, the memory 64 may be volatile (such as random access memory (RAM)) and/or non-volatile (such as read-only memory (ROM), flash memory, etc.). The memory 64 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 64 may include multiple different types of memory, such as static random access memory (SRAM), dynamic random access memory (DRAM), or ROM. The memory 64 includes tangible, non-transitory computer-readable storage media. Combinations of any of above should also be included within the scope of computer-readable media.

As shown, the controller 62 is communicatively coupled to components of the fluid circuit 45 including the secondary compressor(s) 46, the one or more heat exchanger(s) 48, the fuel supply conduit 50, the diluent 42 from the heat exchanger 48, the other source of diluents 42, the combustibles 39, and the one or more control valves 52 to control the flow of the fuel 24 to the fuel nozzle 22. The controller 62 is also communicatively coupled to several sensors 68 along the fluid circuit 45. In addition, the controller 62 may receive data from sensors 68 disposed throughout out the gas turbine system 10 (e.g., indicative of one or more operating conditions).

The one or more sensors 68 disposed throughout the fluid circuit 45 and the gas turbine system 10 may output data. The controller 62 may receive data output by the various sensors 68, including but not limited to flow rate sensors, temperature sensors, pressure sensors, humidity sensors, composition sensors, or any combination thereof. The controller 62 may also receive data output by other sensors 68 that are configured to measure operating conditions of other components of the gas turbine system 10, such as the compressor 14, the gas turbine 32, or other components. The controller 58 may utilize closed-loop control to control the process (e.g., calculate a Wobbe index value for the fuel, control the flow rate of the discharge air, etc.). The sensors 68 measure conditions of the gas turbine system 10, as described above. A transmitter may convert the measurements to electronic signals which are then read by the controller 58. The controller 58 may then determine if the current condition of the fluid circuit 45 (e.g., calculation of the Wobbe index value for the fuel, the flow rate of the discharge air, etc.) is acceptable. If the controller 58 determines that the current condition of the fluid circuit 45 (e.g., calculation of the Wobbe index value for the fuel, the flow rate of the discharge air, etc.) is not acceptable, the controller 58 instructs one or more of the components (e.g., the compressor 14, the gas turbine 32, the secondary compressor(s) 46, the one or more heat exchanger(s) 48, the one or more control valves 52) to adjust its operating conditions to adjust the conditions. The closed-loop control sequence described above may repeat continuously until a desired process condition is met.

The controller 58 uses the data output by the sensors 68 to adjust the flow rate of the diluents 42 (e.g., purge air 44) to the secondary compressor 46 and to the heat exchanger 48. The controller 58 may adjust the flow rate of the purge air 44 flow based at least in part on the feedback received from the one or more sensors 68 to achieve desired a Wobbe index of the fuel supply 24. As may be appreciated, the controller 62 may similarly regulate a composition and/or an amount of an alternative diluent source 42 (e.g., steam, inert gases) and/or a composition and/or the amount of the combustible fluid 39 (e.g., hydrocarbons, hydrogen gas, etc.) based at least in part on the feedback received from the one or more sensors 68 to achieve desired a Wobbe index of the fuel supply 24. As may be appreciated, the heating value of the fuel may be referred to as the gross caloric value, the gross energy, or the Wobbe Index rating. The heating value generally describes the amount of heat or energy released when the fuel is combusted. By adjusting the chemical and physical characteristics of the fuel (e.g., by controlling the amount of purge air 44 added to the fuel supply 24), the same fuel nozzle 22 may be used to enable the Wobbe Index of the fuel 24 to remain at a suitable level for the fuel nozzle 22. By adjusting the Wobbe Index of the fuel, the same combustion hardware (e.g., nozzles, covers) may be used for the various fuel sources. A method of adjusting the physical and chemical characteristics of the fuel may be further understood with reference to FIG. 4.

Figure 4:
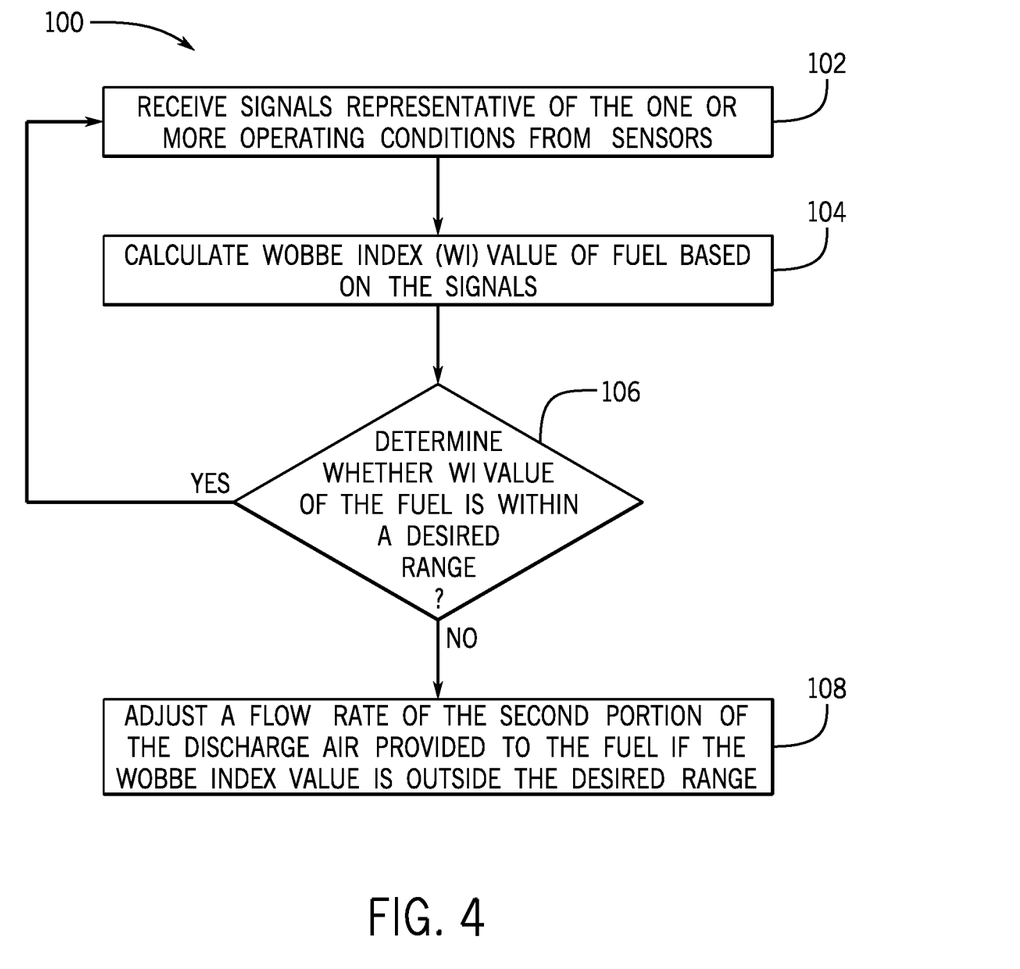
FIG. 4 is a flow diagram of an embodiment of a method for adjusting fuel flow of the flexible fuel system to the gas turbine system, according to an embodiment.

FIG. 4 is a flow diagram illustrating details of an example method 100 for adjusting fuel flow of the flexible fuel system 12 to the gas turbine system 10 using the controller 62, according to an embodiment. The controller 62 receives (block 102) one or more signals from the one or more sensors 68 disposed throughout the fluid circuit 45 and/or throughout the gas turbine system 10. The sensors 68 may measure flow rates, temperature, pressure, composition of the fuel. The controller 62 calculates (block 104) a Wobbe Index value of the fuel 24 that is supplied to the fuel nozzle 22 for combustion. The controller 62 determines (block 106) if the Wobbe index of the fuel is within a desired range. If the controller 62 determines that the Wobbe index of the fuel is not within the desired range, the controller adjusts (block 108) a flow rate of the second portion 47 of the discharge air 44, the other source of diluent 42, and/or the combustible fuel 39 provided to the fuel if the Wobbe index value is outside of the desired range. If the controller 62 determines that the Wobbe index of the fuel is within the desired range, the controller 62 continues to monitor the gas turbine system 10.

Technical effects of the subject matter include adjusting the fuel composition (e.g., by controlling the amount of purge air added to the fuel supply), to enable use of the same combustion hardware (e.g., a fuel nozzle) for various fuel supplies. The fluid circuit 45 may be used to enable the chemical and physical characteristics (e.g., Wobbe index or heating value) of the fuel to remain at a suitable level for the fuel nozzle 22. Adjusting the chemical and physical characteristics (e.g., Wobbe index or heating value) of the fuel includes cooling a portion 47 of the purge air 44 to a temperature less than an auto-ignition temperature of the fuel. Moreover, other suitable diluents or combustible fluids may be used to adjust the chemical and physical characteristics of the fuel supply 24. By adjusting the chemical and physical characteristics (e.g., Wobbe index or heating value) of the fuel, the same combustion hardware (e.g., nozzles, covers) may be used for various fuel sources.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine system comprising a first compressor, a combustor, and a turbine;
   a fluid circuit configured to supply a gas fuel, air, and at least one non-combustible fluid to the combustor, wherein the at least one non-combustible fluid is different from the gas fuel and the air;
   a heat exchanger disposed along the fluid circuit, wherein the heat exchanger transfers heat away from the air to cool the air to a temperature less than an auto-ignition temperature of the gas fuel;
   one or more sensors, wherein the one or more sensors measure one or more operating conditions of the gas turbine system; and
   a controller configured to:
   receive one or more signals from the one or more sensors;
   control a Wobbe index of the gas fuel within a desired range by adjusting a flow of the air through the heat exchanger to the combustor and a flow of the at least one non-combustible fluid to the combustor relative to a flow of the gas fuel to the combustor for a gas fuel combustion, wherein the control of the Wobbe index is based on the one or more signals, wherein the control of the Wobbe index of the gas fuel occurs at least during the gas fuel combustion of the gas fuel without any liquid fuel.

2. The system of claim 1, wherein the one or more operating conditions comprise a composition of the gas fuel, the one or more signals are indicative of the composition of the gas fuel, and the controller is configured to determine a type of the gas fuel based on the one or more signals.

3. The system of claim 1, wherein the at least one non-combustible fluid comprises an inert gas.

4. The system of claim 1, wherein the at least one non-combustible fluid comprises steam.

5. The system of claim 1, wherein the first compressor comprises an air outlet disposed upstream from a compressor discharge outlet, the air outlet is coupled to the fluid circuit, the compressor discharge outlet is coupled to an air flow path extending to the combustor separate from the fluid circuit, and the fluid circuit comprises a second compressor configured to boost a pressure of the air received from the air outlet.

6. The system of claim 1, wherein the fluid circuit is configured to inject the air cooled by the heat exchanger and the at least one non-combustible fluid at a location downstream from a fuel outlet of a fuel nozzle during the gas fuel combustion of the gas fuel in the combustor.

7. The system of claim 1, wherein the fluid circuit is configured to supply at least a portion of the air cooled by the heat exchanger into the combustor without flowing through any fuel nozzle during the gas fuel combustion of the gas fuel in the combustor.

8. A system, comprising:
   a gas turbine system comprising a compressor, a combustor, and a turbine;
   a dilution air circuit configured to supply a gas fuel, air, and at least one non-combustible fluid to the combustor, wherein the at least one non-combustible fluid is different from the gas fuel and the air;
   a heat exchanger disposed along the dilution air circuit, wherein the heat exchanger transfers heat away from the air to cool the air to a temperature less than an auto-ignition temperature of the gas fuel;
   one or more sensors, wherein the one or more sensors measure one or more operating conditions of the gas turbine system; and
   a controller communicatively coupled to the one or more sensors, wherein the controller is programmed to:
   receive one or more signals from the one or more sensors;
   calculate a Wobbe index value for the gas fuel based on the one or more signals;
   determine if the Wobbe index value of the gas fuel is within a desired range; and
   control the Wobbe index value of the gas fuel at least by adjusting a flow of the air through the heat exchanger to the combustor relative to a flow of the gas fuel to the combustor for a gas fuel combustion if the Wobbe index value is outside the desired range, wherein the control of the Wobbe index value of the gas fuel occurs at least during the gas fuel combustion of the gas fuel without any liquid fuel.

9. The system of claim 8, wherein the dilution air circuit does not mix the gas fuel and the air upstream from a fuel nozzle of the combustor.

10. The system of claim 8, wherein the non-combustible fluid comprises an inert gas or steam.

11. The system of claim 8, wherein the one or more operating conditions comprise a composition of the gas fuel, the one or more signals are indicative of the composition of the gas fuel, and the controller is configured to determine a type of the gas fuel based on the one or more signals.

12. The system of claim 8, wherein the compressor comprises an air outlet disposed upstream from a compressor discharge outlet, the air outlet is coupled to the dilution air circuit, the compressor discharge outlet is coupled to an air flow path extending to the combustor separate from the dilution air circuit, and the dilution air circuit comprises a booster compressor configured to boost a pressure of the air received from the air outlet.

13. The system of claim 8, wherein the dilution air circuit is configured to inject the air cooled by the heat exchanger at a location downstream from a fuel outlet of a fuel nozzle during the gas fuel combustion of the gas fuel in the combustor, and the fuel nozzle is configured to inject the gas fuel into the combustor.

14. The system of claim 8, wherein the controller is communicatively coupled to the one or more sensors, and wherein the one or more operating conditions comprise a temperature, a pressure, and a composition of the gas fuel.

15. A method comprising:
   receiving, at a controller, one or more signals representative of one or more operating conditions of a gas turbine system from one or more sensors;
   calculating, via the controller, a Wobbe index value for a gas fuel supplied to a combustor of the gas turbine system;
   determining if the Wobbe index value of the gas fuel is within a desired range based on the one or more signals;
   if the Wobbe index value of the gas fuel is outside the desired range, changing the Wobbe index value of the gas fuel by adjusting a flow of an air cooled by a heat exchanger and supplied to the combustor and a flow of at least one non-combustible fluid supplied to the combustor relative to a flow of the gas fuel to the combustor for a gas fuel combustion, wherein the at least one non-combustible fluid is different from the gas fuel and the air, wherein the air is extracted from a compressor of the gas turbine system before flowing through the heat exchanger to the combustor, the heat exchanger transfers heat away from the air to cool the air to a temperature less than an auto-ignition temperature of the gas fuel, wherein changing the Wobbe index value of the gas fuel occurs at least during the gas fuel combustion of the gas fuel without any liquid fuel.

16. The method of claim 15, wherein the one or more operating conditions of the gas turbine system comprise a temperature, a pressure, and a composition of the gas fuel.

17. The method of claim 15, comprising supplying at least a portion of the air cooled by the heat exchanger into a combustor without flowing through any fuel nozzle during the gas fuel combustion of the gas fuel in the combustor.

18. The method of claim 15, wherein the at least one non-combustible fluid comprises an inert gas or steam.

* * * * *